Patented May 3, 1949

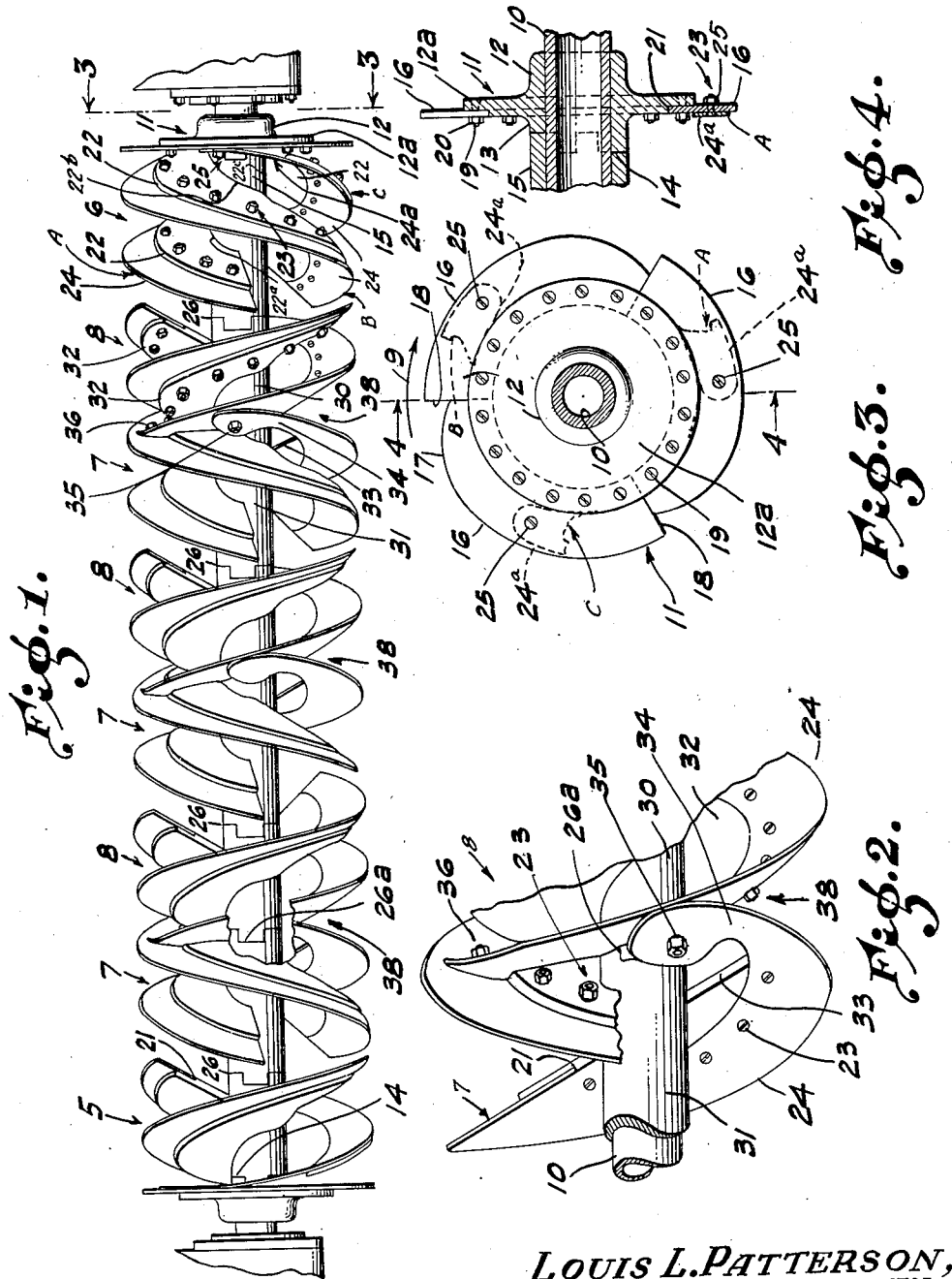

2,468,776

UNITED STATES PATENT OFFICE 2,468,776

CUTTER ASSEMBLY FOR ROTARY PLOWS

Louis L. Patterson, Los Angeles, Calif.

Application December 17, 1946, Serial No. 716,733

11 Claims. (Cl. 97—219)

1

The present invention relates to improvements in cutter assemblies for rotary plows.

The object of this invention is to improve upon my pending application, S. N. 594,712; filed May 19, 1945, on a similar device.

The present application in common with my said pending application provides a structure wherein a plurality of rotatable spiral plow blades are arranged in end to end sections and are mechanically driven in a forward direction, that is to say, in the same direction as the wheels of the vehicle; but at a much faster speed than they would turn if their rotation where caused by trailing the vehicle across the ground. But the present application differs from said pending application in that, whereas in the latter application it was necessary in making repairs, in some instances to dismantle the entire cutter assembly and in other instances a considerable portion thereof; in the present application the parts are so assembled that no dismantling is necessary except to remove the damaged part and replace it with a perfect new one. Also in said pending application the lead ends of the plow blades of adjacent sections were lapped one behind the other in such a manner that there would not be produced an unplowed ridge between the cutter sections. However, a disadvantage resulted from this arrangement for it permitted trash to get in behind the point of the lead ends of the various blade portions of the cutter assembly. To overcome this a structure is provided in the present application wherein, between cutter sections, the lead end of one cutter blade of one section is carried over and anchored to the opposite lead end of the adjacent cutter blade of the next section. This prevents the aforesaid trouble caused by the accumulation of trash, weeds, cover crop or other vegetable growth that is being plowed under, and also affords secure anchorage for the leading ends of each of the adjacent cutter sections.

Also in the present application, in addition to the already mentioned changes the end plates of the cutter assembly have been redesigned so that they are no longer solid disks but are made up of independent detachable segments, the same in number as the spiral blades of each cutter section of the assembly. With this construction, by detachably securing said end plate segments to the adjacent cutter blades said end segments can

2 be replaced simultaneously with or independently of the latter and this can be done without dismantling the cutter shaft assembly. This is an important advantage especially where the necessity of removing a damaged part must be attended to in the field.

A further object of the invention resides in arcuately beveling the peripheral leading end portions of the detachable segments comprising the end plates, whereby such leading edges are sheltered by the trailing end portion of the next blade in advance in addition to obviating the disadvantages aforesaid.

Other objects, features and advantages of invention will hereinafter appear.

Referring to the accompanying drawing, which illustrates a preferred, reduced to practice, embodiment of the invention, Fig. 1 is a rear elevation of the complete plow blade assembly, fragments of the mounting means therefor being shown. Also parts are broken away to disclose underlying structure.

Fig. 2 is an enlarged reproduction of a fragment of the structure shown in Fig. 1, illustrating the manner of attaching to each other the adjacent leading ends of the plow blades where cutter assembly sections meet.

Fig. 3 is an enlarged sectional view taken on line 3—3 of Fig. 1.

Fig. 4 is a section taken on line 4—4 of Fig. 3.

Referring in detail to the drawing, the rotary plow cutter assembly comprises the end sections 5 and 6 and intermediate assembly sections 7 and 8. As the plow advances away from the observer, as viewed in Fig. 1, said sections are all power driven in the direction indicated by the arrow 9 in Fig. 3. At such time, as viewed in Fig. 1, the plow sections 5 and 8 impart a leftward thrust, and the remaining sections 6 and 7 impart a right hand thrust. Therefore a balanced thrust is imparted to the sleeve shaft 10 upon which the cutter assembly is mounted.

Describing in detail the end sections of the spiral portion of the cutter assembly, at each of the outer ends of the cutter assemblies 5 and 6 there is mounted upon the shaft 10 a radial peripheral flange structure 11 including a collar provided with an outwardly directed flange 12 surrounding the shaft 10, said collar 12 having at its inner end an annular flange 13 which forms one side portion of a mortise and tenon joint structure 14 of the rotatable shaft structure, the opposite side portion of said joint structure being formed by the end portion of the mounting sleeve 15 of the adjacent cutter section 6 of the rotatable shaft structure. Said collar also has a radially extending peripheral flange 12a to which are detachably secured a plurality of circumferentially arranged, radially extending, plate segments 16, the attaching means shown in the drawing consisting of stove bolts 19 provided with nuts 20. Said flange 12a is shown provided with an annular shoulder 21 against which the inner edges of said plate or blade segments abut. Each segmental plate 16 has a leading end portion which has a peripheral arcuate bevel 17 which alines with, abuts against and is sheltered by the trailing end portion 18 of the next plate in advance. This arrangement not only protects the leading edge of each of said segmental plates, but also prevents trash from being picked up by the leading ends of these segmental plates.

At the left end of the plow blade assembly the already described construction is duplicated except that at one end the parts are constructed in a right handed manner and at the other end in a left handed manner. Therefore the description already given will suffice for both end portions of the rotary cutter blade assembly.

Describing next the portion of the rotary cutter assembly inwardly adjacent to the radial peripheral flange structure already described, the sleeve 15 is provided wtih a plurality of parallel, spiral mounting flanges 22, three of these being shown in the illustrated embodiment in Figs. 1 and 3. The inner portions of said flanges are welded, cast integral with or are otherwise secured to said sleeve 15 at 22a, 22b and 22c, said sleeve forming a part of the shaft structure which supports the groups of intercoiled blades. To the outer edge portions of these spiral flanges are detachably secured, for example, by bolts 23, parallel spiral blades 24, the leading end of each plow blade 24 being extended at 24a a short distance beyond its mounting flange as shown in one instance at the right hand end of Fig. 1, each blade being there attached by a bolt 25 to the adjacent segment 16 carried by the collar 12 as shown in Fig. 3. The flanges 22 upon which the blades 24 are mounted preferably extend through a circumferential extent of 240 degrees. The trailing edge of each blade 24 will be understood to be the exhaust end thereof, its opposite end having already been designated as its leading end.

With further reference to the cutter section 6, it will be observed from Fig. 1 that the trailing end of each cutter blade's mounting flange 22, as well as the blades 24 themselves extend radially outward from the periphery fo the sleeve 15 to which they are attached and, with reference to the axis of the rotary plow blade assembly, the blade's tip portions overlap slightly the exhaust end of the blade of the adjacent cutter assembly section.

In order to circumferentially space the exhaust end of the overlapping blades of adjacent assembly sections, intermediate mortise and tenon joints 26 are provided which are similar to the mortise and tenon joints 14 already described, and also shown in my aforesaid copending application. Owing to the mortise and tenon joints between cutter sections which have been described determining the circumferential relations of the parts carrying them, it will be seen that it is quite easy to circumferentially space equally from each other the exhaust ends of the adjacent blades of adjacent plow blade sections 6 and 8, (5 and 7, and 7 and 8), as well as the cutter sections 5 and 6 with the peripheral flange structures 11 to bring into proper alinement the cutter blades and the plate segments 16 to which they are fastened.

The plow blade cutter assembly section 5 is identical with the plow blade cutter assembly section 6, except that the group of intercoiled blades of one section are oppositely pitched to those of the other section. Therefore a description of one of these end cutter assembly sections is sufficient for both.

As to the intermediate sections 7 and 8, they too each include a sleeve 30 or 31 which surrounds the sleeve shaft 10 and the ends of which have mortise and tenon joint connections 26a, with each other. Each of said intermediate sections 7 and 8 includes a group of the intercoiled, parallel spiral mounting flanges 32, corresponding with the aforesaid spiral mounting flanges 22 and being likewise cast integral with or welded to the sleeves 30 or 31 which carry them.

As well shown in Fig. 1, where the ends of adjacent sections of the sections 7 and 8 meet, the leading end portion of each blade section 7 (or 8) is extended beyond its mounting flange at 33, the terminal portion 34 of the blade being secured, for example, by a bolt and nut securing means 35 to the spiral blade of the adjacent plow blade section, the latter blade, in turn, being extended beyond both its supporting flange and said securing means 35 and near its extremity being secured by fastening means 36 to another of the three intercoiled blades of the set to which the aforesaid blade having the terminal end portion 34 belongs.

The detailed manner of making the aforesaid connections between blades at the ends of adjacent assembly sections is shown in enlarged detail in Fig. 2, where it will be seen as indicated by the numeral 38, that the connected blade portions diverge in a curved, symmetrical manner so that when the leading end portions of the blades enter the soil they will spread the soil in opposite directions in a thrust balancing manner.

Cutter assembly sections 7 and 8 are the same, except that, as seen in Fig. 1, their plow blades are oppositely pitched.

I claim:

1. In a power driven plow, a rotatable shaft structure mounted in an adjacent overlying relation to the ground for being power driven, and a plurality of plow blades fixed to and spirally surrounding said shaft structure, said blades being divided into groups wherein the blades of each group are intercoiled and with adjacent groups occupying different sections of the length of said shaft structure, the blades of one group where the groups meet having at one end of each group a leading end portion which is fastened to the corresponding leading end portion of the adjacent end blade of the other of the two meeting groups.

2. The subject matter of claim 1, and there being a face-to-face abutting against each other of said fastened together blade end portions.

3. The subject matter of claim 1, and said fastened together blade end portions being abutted against each other adjacent to their extremities and then diverging from each other in a symmetrical manner.

4. In a power driven plow, a rotatable shaft structure mounted in an adjacent overlying relation to the ground for being power driven, and a plurality of plow blades fixed to and spirally surrounding said shaft structure, said blades being divided into groups wherein the blades of each group are intercoiled and with adjacent groups occupying different sections of the length of said shaft structure, a radial peripheral flange structure carried by said shaft structure adjacent to each outer end of the end groups of said assembly of groups, the leading end portions of each spiral blade of the outermost groups being detachably fastened to the radial peripheral flange structure at its end of the assembly.

5. In a power driven plow, a rotatable shaft structure mounted in an adjacent overlying relation to the ground for being power driven, and a plurality of plow blades fixed to and spirally surrounding said shaft structure, said blades being divided into groups wherein the blades of each group are intercoiled and with adjacent groups occupying different sections of the length of said shaft structure, a radial peripheral flange structure carried by said shaft structure adjacent to each outer end of the end groups of said assembly of groups, the leading end portions of each spiral blade of the outermost groups being detachably fastened to the radial peripheral flange structure at its end of the assembly, said shaft structure including a collar which supports said radial peripheral flange structure.

6. The subject matter of claim 5, and said radial flange structure comprising an annular radial flange carried by said collar, and a plurality of radial segmental plates carried by said annular radial flange, individual leading end portions of said spiral blades being fastened to individual said segmental plates.

7. The subject matter of claim 5, and said radial flange structure comprising an annular radial flange carried by said collar, and a plurality of radial segmental plates carried by said annular radial flange, individual leading end portions of said spiral blades being fastened to individual said segmental plates, the leading end portions of said segmental plates being peripherally beveled to radially inward points in relation to adjacent trailing ends of the next segmental plate in advance.

8. In a power driven plow, a rotatable shaft structure mounted in an adjacent overlying relation to the ground for being power driven, and a plurality of plow blades fixed to and spirally surrounding said shaft structure, said blades being divided into groups wherein the blades of each group are intercoiled and with adjacent groups occupying different sections of the length of said shaft structure, a plurality of intercoiled radial spiral flanges which form a part of each section of said shaft structure, the individual spiral blades of each section having their inner edge portions extending along and secured to the peripheral portions of the individual flanges of the same section, the leading end portion of each of said blades extending beyond the end of the flange which carries such blade, and means securing the terminal part of such leading end blade portion to an adjacent blade of the opposed end portion of the next blade carrying section.

9. In a power driven plow, a rotatable shaft structure mounted in an adjacent overlying relation to the ground for being power driven, and a plurality of plow blades fixed to and spirally surrounding said shaft structure, said blades being divided into groups wherein the blades of each group are intercoiled, and with the blades of adjacent groups oppositely pitched and occupying different portions of the length of said shaft structure, and in every alternate meeting place of the blade groups along the length of said shaft structure the leading end portions of the blades of one group being individually attached to individual blade portions of the other group, and in the intermediate meeting points the trailing end portions of the blades being in a free equally spaced relation to each other and overlapping each other in relation to the length of the shaft structure.

10. In a power driven plow, a rotatable shaft structure mounted in an adjacent overlying relation to the ground for being power driven, said shaft structure including a continuous inner shaft and a sleeve shaft therearound, said sleeve shaft being divided into sections having mortise and tenon joint connections with each other, blade-carrying means carried by each of said shaft sections a group of intercoiled spiral plow blades mounted on said blade-carrying means of each of the sections of said sleeve shaft, in each of said shaft sections the plow blades all being pitched in the same direction, a collar secured around each end portion of said inner shaft and having a radial peripheral flange structure, the intercoiled plow blades of the adjacent sleeve shaft sections all having end portions which are attached to the adjacent face of said radial flange structure, the individual plow blades of each of said groups of blades where alternate groups meet having leading end portions equally spaced apart circumferentially of said shaft structure, the circumferentially alternate leading blade end portions of one section being fastened to the circumferentially alternate leading end portions of the adjacent section, and at the meeting places of the groups which intervene between said alternate meeting places the trailing blade end portions of one group being equally spaced apart from each other circumferentially, free from each other and in a detached overlapping relation to the end blades of the adjacent group.

11. As an article of manufacture, a sleeve shaft section in two parts each of which carries three spiral, intercoiled, peripheral plow-blade-mounting flanges each having a circumferential extent of substantially 240 degrees and a spiral plow blade having an inner edge portion attached to each of said flanges and an outer edge portion extending radially therebeyond, in one part of the two-part structure said flanges and the blades carried by them being pitched oppositely to the direction in which they are pitched in the other part thereof, where the two parts of said structure meet the individual blades of one group of the plow blades extending beyond their mounting flanges and being attached to blade portions of the other of the two parts of the structure.

LOUIS L. PATTERSON.

REFERENCES CITED

The following references are of record in the file of this patent:

UNITED STATES PATENTS

| Number | Name | Date |
|---|---|---|
| 191,332 | Freeborn | May 29, 1877 |
| 1,715,335 | Graf | June 4, 1929 |
| 1,836,984 | Newsom | Dec. 15, 1931 |
| 1,878,142 | Hjermstad | Sept. 20, 1932 |
| 2,408,361 | Bagan | Oct. 1, 1946 |